United States Patent
Aoki et al.

(10) Patent No.: US 11,198,281 B2
(45) Date of Patent: Dec. 14, 2021

(54) LAMINATED FILM FOR FIBER ADHESION AND/OR FIBER SHEET SURFACE PROTECTION AND THERMOSETTING COMPOSITION FOR FIBER ADHESION AND/OR FIBER SHEET SURFACE PROTECTION

(71) Applicant: THE NIPPON SYNTHETIC CHEMICAL INDUSTRY CO., LTD., Osaka (JP)

(72) Inventors: Yasuhiro Aoki, Osaka (JP); Katsuhiko Katsuma, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 339 days.

(21) Appl. No.: 16/363,451

(22) Filed: Mar. 25, 2019

(65) Prior Publication Data

US 2019/0217588 A1 Jul. 18, 2019

Related U.S. Application Data

(63) Continuation of application No. PCT/JP2017/034664, filed on Sep. 26, 2017.

(30) Foreign Application Priority Data

Sep. 26, 2016 (JP) .............................. JP2016-187444
Sep. 26, 2016 (JP) .............................. JP2016-187445

(51) Int. Cl.

| | |
|---|---|
| *B32B 27/40* | (2006.01) |
| *C08G 18/67* | (2006.01) |
| *C08G 18/42* | (2006.01) |
| *C09J 175/16* | (2006.01) |
| *C09J 7/35* | (2018.01) |
| *C09J 11/08* | (2006.01) |
| *C09J 133/00* | (2006.01) |
| *C09J 11/06* | (2006.01) |
| *C08F 290/06* | (2006.01) |
| *C09J 4/06* | (2006.01) |
| *C08G 18/75* | (2006.01) |
| *B32B 5/28* | (2006.01) |
| *C08G 18/48* | (2006.01) |
| *C08G 18/72* | (2006.01) |
| *C08J 5/24* | (2006.01) |
| *C08K 5/14* | (2006.01) |
| *C08K 5/23* | (2006.01) |

(52) U.S. Cl.
CPC .............. *B32B 27/40* (2013.01); *B32B 5/28* (2013.01); *C08F 290/06* (2013.01); *C08G 18/42* (2013.01); *C08G 18/4833* (2013.01); *C08G 18/672* (2013.01); *C08G 18/72* (2013.01); *C08G 18/755* (2013.01); *C08J 5/24* (2013.01); *C09J 4/06* (2013.01); *C09J 7/35* (2018.01); *C09J 11/06* (2013.01); *C09J 11/08* (2013.01); *C09J 133/00* (2013.01); *C09J 175/16* (2013.01); *C08J 2375/14* (2013.01); *C08K 5/14* (2013.01); *C08K 5/23* (2013.01); *C09J 2433/00* (2013.01)

(58) Field of Classification Search
CPC ......... B32B 27/40; B32B 5/28; C08G 18/672; C08G 18/4833; C08G 18/72; C08J 2375/14; C08J 5/24
USPC ..................................................... 428/423.1
See application file for complete search history.

(56) References Cited

U.S. PATENT DOCUMENTS

| | | |
|---|---|---|
| 2003/0003257 A1 | 1/2003 | Kendall et al. |
| 2004/0089409 A1 | 5/2004 | Kendall et al. |
| 2009/0258224 A1 | 10/2009 | Kawabe et al. |
| 2011/0250457 A1 | 10/2011 | Oota et al. |
| 2014/0213729 A1 | 7/2014 | Hongo |
| 2016/0130432 A1 | 5/2016 | Sumii et al. |
| 2016/0251553 A1 | 9/2016 | Garrett et al. |

FOREIGN PATENT DOCUMENTS

| | | | |
|---|---|---|---|
| CA | 2039840 | 10/1991 | |
| CA | 2039840 A1 * | 10/1991 | ............... C08K 7/02 |
| CN | 1394899 A | 2/2003 | |
| CN | 101283068 | 10/2008 | |
| CN | 105229061 | 1/2016 | |
| EP | 0454983 | 11/1991 | |
| EP | 3052568 A2 | 8/2016 | |
| JP | 62-146929 | 6/1987 | |
| JP | 62-146930 | 6/1987 | |
| JP | 04-224916 | 8/1992 | |
| JP | 04-227642 | 8/1992 | |
| JP | 06-032920 | 2/1994 | |
| JP | 2003-201388 | 7/2003 | |

(Continued)

OTHER PUBLICATIONS

Extended European Search Report, European Patent Office, Application No. 17853225.5, dated Aug. 30, 2019, 6 pages.

(Continued)

*Primary Examiner* — Hui H Chin

(74) *Attorney, Agent, or Firm* — Greenblum & Bernstein, P.L.C.

(57) ABSTRACT

The present invention relates to a laminated film for fiber adhesion and/or fiber sheet surface protection in which a layer [I] containing a thermosetting composition [i] and a support film [II] are laminated, wherein the thermosetting composition [i] contains a thermal polymerization initiator (C) having a 10-hour half-life temperature of 65° C. or higher.

9 Claims, No Drawings

(56) References Cited

FOREIGN PATENT DOCUMENTS

| | | |
|---|---|---|
| JP | 2005-247879 | 9/2005 |
| JP | 2010-138248 | 6/2010 |
| JP | 2013-245268 | 12/2013 |
| JP | 2013245268 A * | 12/2013 |
| KR | 2016-0025050 A | 3/2016 |
| WO | 2012/141299 | 10/2012 |
| WO | 2014/115778 | 7/2014 |
| WO | 20 15/056585 | 4/2015 |
| WO | 2015-102699 A2 | 7/2015 |

OTHER PUBLICATIONS

International Search Report in International Patent Application No. PCT/JP2017/034664, dated Oct. 31, 2017, with English translation.
International Preliminary Report on Patentability in International Patent Application No. PCT/JP2017/034664, dated Mar. 26, 2019, with English translation.
Notice of Reasons for Refusal issued in JP Patent Application No. 2017-178293, dated Jun. 1, 2021, English translation.
Notice of Reasons for Refusal issued in JP Patent Application No. 2017-178294, dated Jun. 1, 2021, English translation.
Office Action issued in Chinese Patent Application No. 201780059097.5, dated Jul. 12, 2021, English translation.
Decision of Rejection issued in CN Patent Application No. 201780059097.5, dated Oct. 20, 2021, English translation.

* cited by examiner

LAMINATED FILM FOR FIBER ADHESION AND/OR FIBER SHEET SURFACE PROTECTION AND THERMOSETTING COMPOSITION FOR FIBER ADHESION AND/OR FIBER SHEET SURFACE PROTECTION

CLAIM FOR PRIORITY

This application is a Continuation of PCT/W2017/034664 filed Sep. 26, 2017, and claims the priority benefit of Japanese applications 2016-187444 and 2016-187445 filed Sep. 26, 2016, the contents of which are expressly incorporated by reference herein in their entireties.

TECHNICAL FIELD

The present invention relates to a laminated film for fiber adhesion and/or fiber sheet surface protection and a thermosetting composition for fiber adhesion and/or fiber sheet surface protection, and more particularly to a laminated film and a thermosetting composition which are used to adhere to a fiber such as a carbon fiber and a glass fiber and/or to protect a fiber sheet surface containing such a fiber.

BACKGROUND ART

Fiber-reinforced plastic is a composite material in which a fiber such as a carbon fiber and a glass fiber is included in plastic as a reinforcing material to improve strength, and is used as a material having a light weight and high strength, namely large specific strength. Since excellent in mechanical properties, such fiber-reinforced plastic has been used for sports articles, aircrafts, and artificial satellites, but application is expected to expand to the field of automobiles in future from expectation of improvement in fuel efficiency due to weight reduction.

Among the fiber-reinforced plastic, for example, a carbon fiber in carbon fiber-reinforced plastic requires a light weight, high strength, and a resin impregnating ability, and the carbon fiber-reinforced plastic requires moldability, productivity (shortening of curing time, workability), recyclability, and shape stability.

Examples of manufacturing the carbon fiber-reinforced plastic include a prepreg method using a prepreg which is a sheet-shaped intermediate base material obtained by impregnating the carbon fiber with an uncured resin, and in this prepreg method, the carbon fiber-reinforced plastic is manufactured by curing the uncured resin after laminating a plurality of prepregs.

Examples of such an uncured resin include a thermoplastic resin and a thermosetting resin such as a thermosetting epoxy resin disclosed in Patent Document 1.

RELATED ART DOCUMENT

Patent Document

Patent Document 1: TP-A-2003-201388

SUMMARY OF INVENTION

Problems to Be Solved by the Invention

However, in a case of using the thermoplastic resin, since a thermoplastic resin having a high molecular weight is used in order to maintain appropriate strength of the carbon fiber-reinforced plastic, there is an issue that viscosity is high, and the carbon fiber is difficult to be impregnated, and there is a problem in terms of adhesion properties.

Further, there is a problem that the thermosetting resin such as the thermosetting epoxy resin disclosed in Patent Document 1 is easy to impregnate the carbon fiber, but requires a long time for curing.

Therefore, an object of the present invention is to provide a laminated film for fiber adhesion and/or fiber sheet surface protection and a thermosetting composition for fiber adhesion and/or fiber sheet surface protection which are good in an impregnating ability into a fiber, can shorten a curing time, and are excellent in adhesion properties to a fiber.

Means for Solving the Problems

As a result of intensive studies to solve the above object, the present inventors have found that the above object can be solved by using a thermosetting composition containing a specific thermal polymerization initiator, thereby completing the present invention.

That is, the present invention relates to the following <1> to <12>.

<1> A laminated film for fiber adhesion and/or fiber sheet surface protection in which a layer [I] containing a thermosetting composition [i] and a support film [II] are laminated, wherein the thermosetting composition [i] contains a thermal polymerization initiator (C) having a 10-hour half-life temperature of 65° C. or higher.

<2> The laminated film for fiber adhesion and/or fiber sheet surface protection described in <1>, wherein the thermosetting composition [i] further contains a hinder polymer (A) and a reactive oligomer (B) having one or more unsaturated groups.

<3> The laminated film for fiber adhesion and/or fiber sheet surface protection described in <2>, wherein the binder polymer (A) is a (meth)acrylic resin (A1).

<4> The laminated film for fiber adhesion and/or fiber sheet surface protection described in any one of <1> to <3>, wherein the thermal polymerization initiator (C) having a 10-hour half-life temperature of 65° C. or higher is an azobis-based compound having a 10-hour half-life temperature of 65° C. or higher or a peroxide-based compound having a 10-hour half-life temperature of 65° C. or higher.

<5> The laminated film for fiber adhesion and/or fiber sheet surface protection described in any one of <1> to <4>, wherein the thermosetting composition [i] further contains a reactive monomer (D) having one or more unsaturated groups.

<6> The laminated film for fiber adhesion and/or fiber sheet surface protection described in any one of <2> to <5>, wherein the reactive oligomer (B) having one or more unsaturated groups is a urethane (meth)acrylate-based oligomer (B1).

<7> The laminated film for fiber adhesion and/or fiber sheet surface protection described in <6>, wherein the urethane (meth)acrylate-based oligomer (B1) is a urethane (meth)acrylate-based compound obtained by a reaction of a hydroxyl group-containing (meth)acrylate-based compound (b1), a polyvalent isocyanate-based compound (b2), and a polyol-based compound (b3).

<8> The laminated film for fiber adhesion and/or fiber sheet surface protection described in <6> or <7>, wherein the urethane (meth)acrylate-based oligomer (B1) has a weight average molecular weight of 500 to 50,000.

<9> The laminated film for fiber adhesion and/or fiber sheet surface protection described in any one of <1> to <8>, wherein the layer [I] containing the thermosetting composition [i] has a thickness of 50 μm or more.

<10> The laminated film for fiber adhesion and/or fiber sheet surface protection described in any one of <1> to <9>, wherein a protective film [III] is laminated on a side of the layer [I] containing the thermosetting composition [i] where the support film [II] is not laminated.

<11> A thermosetting composition for fiber adhesion and/or fiber sheet surface protection, comprising a binder polymer (A), a reactive oligomer (B) having one or more unsaturated groups, and a thermal polymerization initiator (C) having a 10-hour half-life temperature of 65° C. or higher.

<12> The thermosetting composition for fiber adhesion and/or fiber sheet surface protection described in <11>, wherein the reactive oligomer (B) having one or more unsaturated groups is a urethane (meth)acrylate-based oligomer (B1).

Effects of the Invention

In the laminated film for fiber adhesion and/or fiber sheet surface protection of the present invention, a thermosetting composition [i] contains a thermal polymerization initiator (C) having a high 10-hour half-life temperature, so that the thermosetting composition [i] has relatively low viscosity in a melting process and is easy to impregnate the fiber. Therefore, since polymerization is started and the composition [i] is thermally cured as temperature rises due to heating, the adhesion properties between the thermosetting composition [i] and the fiber are good, and adhesion properties between the fibers and design such as surface smoothness and glossiness of the fiber are excellent.

In addition, for example, in the prepreg method, the fiber-reinforced plastic can be manufactured in a short time by thermally curing the thermosetting composition [i] by hot pressing after a layer [I] containing the thermosetting composition [i] is laminated on a support film [II], so that productivity and workability of the fiber-reinforced plastic are excellent.

Further, the thermosetting composition for fiber adhesion and/or fiber sheet surface protection of the present invention can be not only a composition constituting the layer [I] in the laminated film for fiber adhesion and/or fiber sheet surface protection of the present invention, but can also be used in a method of manufacturing the fiber-reinforced plastic such as a RTM (resin injection molding) method, a hand lay-up molding method, a SMC press molding method, a BMC molding method, a FW (filament winding) method, a pultrusion method, and a pin winding molding method, thereby having an effect that the adhesion properties between the fibers and the surface smoothness of the fiber are excellent.

In addition, in the laminated film for fiber adhesion and/or fiber sheet surface protection of the present invention, a cured product has flexibility even after the polymerization is started and the composition [i] is thermally cured as temperature rises due to heating, and the adhesion properties between the thermosetting composition [i] and the fiber are good, and the adhesion properties between the fibers and the design such as surface smoothness and glossiness of the fiber are excellent.

EMBODIMENTS FOR CARRYING OUT THE INVENTION

Hereinafter, configurations of the present invention will be described in detail, but they show an example of desirable embodiments, and the present invention is not limited to these contents.

A laminated film of the present invention is a laminated film for fiber adhesion and/or fiber sheet surface protection in which a layer [I] containing a thermosetting composition [i] and a support film [II] are laminated. The "laminated film for fiber adhesion and/or fiber sheet surface protection" means a laminated film used for at least one application of fiber adhesion and fiber sheet surface protection.

Hereinafter, the thermosetting composition [i] will be described.

Hereinafter, the laminated film for fiber adhesion and/or fiber sheet surface protection of the present invention may be simply abbreviated to "laminated film", the cured thermosetting composition [i] may be referred to as "cured product [i]", the layer [I] containing the uncured thermosetting composition [i] may be referred to as "thermosetting composition layer [I]", and the layer [I] containing the thermosetting composition [i] after curing may be referred to as "cured layer [I]".

The thermosetting composition [i] used in the present invention is a resin composition which can be cured by heat, and preferably contains a compound having an unsaturated group. Examples of the compound having an unsaturated group include a reactive oligomer having one or more unsaturated groups and a reactive monomer.

Such a thermosetting composition [i] contains a thermal polymerization initiator (C) having a 10-hour half-life temperature of 65° C. or higher, preferably further contains a binder polymer (A) and a reactive oligomer (B) which has one or more unsaturated groups, and more preferably further contains a reactive monomer (D) having one or more unsaturated groups.

Hereinafter, each component will be described.

<Binder Polymer (A)>

The binder polymer (A) in the present invention is used for a purpose of appropriately adjusting viscosity of the uncured thermosetting composition [i], and examples thereof include a (meth)acrylic resin (A1), a polyurethane-based resin, and an epoxy-based resin. Among them, the (meth)acrylic resin (A1) is preferable in terms of ease of adjusting the viscosity.

Hereinafter, the (meth)acrylic resin (A1) will be described more specifically.

The (meth)acryl represents acryl or methacryl, and (meth)acrylate represents acrylate or methacrylate.

[(Meth)Acrylic Resin (A1)]

The (meth)acrylic resin (A1) in the present invention is a resin obtained by polymerizing a monomer component containing a (meth)acrylic monomer. The (meth)acrylic resin (A1) can be used alone or in combination of two or more kinds thereof.

The (meth)acrylic resin (A1) preferably contains (meth)acrylate-based monomer (a1) as a main polymerization component, and can also use a functional group-containing monomer (a2) and another copolymerizable monomer (a3) as copolymerization components if necessary.

Examples of such a (meth)acrylate-based monomer (a1) include aliphatic (meth)acrylate-based monomers such as alkyl (meth)acrylates, and aromatic (meth)acrylate-based monomers such as phenyl (meth)acrylate.

Regarding such alkyl (meth)acrylate, it is preferable that carbon number of an alkyl group is generally 1 to 12, particularly 1 to 8, and further 1 to 4, and specific examples of the alkyl (meth)acrylate include methyl (meth)acrylate, ethyl (meth)acrylate, n-butyl (meth)acrylate, iso-butyl (meth)acrylate, tert-butyl (meth)acrylate, n-propyl (meth)acrylate, n-hexyl (meth)acrylate, 2-ethylhexyl (meth)acrylate, n-octyl (meth)acrylate, isodecyl (meth)acrylate, lauryl (meth)acrylate, cetyl (meth)acrylate, stearyl (meth)acrylate, cyclohexyl (meth)acrylate, and isobornyl (meth)acrylate. Examples of such phenyl (meth)acrylate include benzyl (meth)acrylate and phenoxyethyl (meth)acrylate.

Examples of another (meth)acrylate-based monomer (a1) include tetrahydrofurfuryl (meth)acrylate. Those can be used alone or in combination of two or more kinds thereof.

Among such (meth)acrylate-based monomer (a1), methyl (meth)acrylate, n-butyl (meth)acrylate, and 2-ethylhexyl (meth)acrylate are preferably used in terms of copolymerizability, adhesion properties, ease of handling, and availability of raw materials.

Examples of the functional group-containing monomer (a2) include a hydroxyl group-containing monomer, a carboxyl group-containing monomer, an alkoxy group-containing monomer, a phenoxy group-containing monomer, an amide group-containing monomer, an amino group-containing monomer, another nitrogen-containing monomer, a glycidyl group-containing monomer, a phosphate group-containing monomer, and a sulfonic acid group-containing monomer, and these can be used alone or in combination of two or more kinds thereof.

Examples of the hydroxyl group-containing monomer include a primary hydroxyl group-containing monomer, a secondary hydroxyl group-containing monomer, and a tertiary hydroxyl group-containing monomer. Examples of the primary hydroxyl group-containing monomer include primary hydroxyl group-containing hydroxyl alkyl (meth)acrylate such as 2-hydroxyethyl (meth)acrylate, 4-hydroxybutyl (meth)acrylate, 5-hydroxypentyl (meth)acrylate, 6-hydroxyhexyl (meth)acrylate, 8-hydroxyoctyl (meth)acrylate, 10-hydroxydecyl (meth)acrylate, and (4-hydroxymethyl cyclohexyl) methyl (meth)acrylate; a caprolactone-modified monomer such as caprolactone modified 2-hydroxyethyl (meth)acrylate; 2-acryloyloxyethyl-2-hydroxyethyl phthalic acid; N-methylol (meth)acrylamide; and N-hydroxyethyl (meth)acrylamide. Examples of the secondary hydroxyl group-containing monomer include secondary hydroxyl group-containing hydroxyalkyl (meth)acrylate such as 2-hydroxypropyl (meth)acrylate and 2-hydroxybutyl (meth)acrylate; 2-hydroxy-3-phenoxypropyl (meth)acrylate; 3-chloro-2-hydroxypropyl (meth)acrylate; and 2-hydroxy-3-phenoxypropyl (meth)acrylate. Examples of the tertiary hydroxyl group-containing monomer include 2,2-dimethyl-2-hydroxyethyl (meth)acrylate.

As the hydroxyl group-containing monomer, polyethylene glycol derivatives such as diethylene glycol mono(meth)acrylate and polyethylene glycol mono(meth)acrylate, polypropylene glycol derivatives such as polypropylene glycol mono(meth)acrylate, oxyalkylene modified monomers such as polyethylene glycol-polypropylene glycol mono(meth)acrylate, poly(ethylene glycol-tetramethylene glycol) mono(meth)acrylate, and polypropylene glycol-tetramethylene glycol) mono(meth)acrylate may be used.

Examples of the carboxyl group-containing monomer include acrylic acid, methacrylic acid, crotonic acid, maleic acid, maleic anhydride, itaconic acid, fumaric acid, acrylamide N-glycolic acid, cinnamic acid, and Michael adducts of (meth)acrylic acid (such as acrylic acid dimer, methacrylic acid dimer, acrylic acid trimer, methacrylic acid timer, acrylic acid tetramer, and methacrylic acid tetramer), and 2-(meth)acryloyloxyethyl dicarboxylic acid monoesters (such as 2-acryloyloxyethyl succinic acid monoester, 2-methacryloyloxyethyl succinic acid monoester, 2-acryloyloxyethyl phthalic acid monoester, 2-methacryloyloxyethyl phthalic acid monoester, 2-acryloyloxyethyl hexahydrophthalic acid monoester, and 2-methacryloyloxyethyl hexahydrophthalic acid monoester). Such a carboxyl group-containing monomer may be used as an acid or may be used in a form of a salt neutralized with an alkali.

Examples of the alkoxy group-containing monomer include aliphatic (meth)acrylates such as 2-methoxyethyl (meth)acrylate, 2-ethoxyethyl (meth)acrylate, 3-methoxybutyl (meth)acrylate, 2-butoxyethyl (meth)acrylate, 2-butoxy diethylene glycol (meth)acrylate, methoxy diethylene glycol (meth)acrylate, methoxy triethylene glycol (meth)acrylate, ethoxy diethylene glycol (meth)acrylate, methoxy dipropylene glycol (meth)acrylate, methoxy polyethylene glycol (meth)acrylate, octoxy polyethylene glycol-polypropylene glycol-mono (meth)acrylate, lauroxy polyethylene glycol mono (meth)acrylate, and stearoxy polyethylene glycol mono (meth)acrylate. Examples of the phenoxy group-containing monomer include aromatic (meth)acrylates such as 2-phenoxyethyl (meth)acrylate, phenoxy polyethylene glycol (meth)acrylate, phenoxy polyethylene glycol-polypropylene glycol (meth)acrylate, and nonylphenol ethylene oxide adduct (meth)acrylate.

Examples of the amide group-containing monomer include acrylamide, methacrylamide, N-(n-butoxyalkyl) acrylamide, N-(n-butoxyalkyl) methacrylamide, N,N-dimethyl (meth)acrylamide, N,N-diethyl (meth)acrylamide, N,N-dimethylaminopropyl (meth)acrylamide, acrylamido-3-methylbutyl methylamine, dimethylaminoalkylacrylamide, and dimethylaminoalkylmethacrylamide.

Examples of the amino group-containing monomer include dimethylaminoethyl (meth)acrylate, diethylaminoethyl (meth)acrylate, and quaternary compounds thereof.

Examples of another nitrogen-containing monomer excluding the amide group-containing monomer and the amino group-containing monomer include acryloylmorpholine.

Examples of the glycidyl group-containing monomer include glycidyl (meth)acrylate and allyl glycidyl ether.

Examples of the phosphate group-containing monomer include 2-(meth)acryloyloxyethyl acid phosphate and bis(2-(meth)acryloyloxyethyl) acid phosphate.

Examples of the sulfonic acid group-containing monomer include olefin sulfonic acid such as ethylene sulfonic acid, allyl sulfonic acid, and methallyl sulfonic acid, 2-acrylamide-2-methylpropane sulfonic acid, styrene sulfonic acid, or salts thereof.

Examples of another copolymerizable monomer (a3) include monomers such as acrylonitrile, methacrylonitrile, styrene, α-methylstyrene, vinyl acetate, vinyl propionate, vinyl stearate, vinyl chloride, vinylidene chloride, alkyl vinyl ether, vinyl toluene, vinylpyridine, vinyl pyrrolidone, dialkyl itaconate, dialkyl fumarate, allyl alcohol, acrylic chloride, methyl vinyl ketone, N-acrylamide methyl trimethylammonium chloride, and allyl trimethylammonium chloride, and dimethylallylvinylketone.

In addition, when for the purpose of a high molecular weight, compounds having two or more ethylenically unsaturated groups such as ethylene glycol di(meth)acrylate, diethylene glycol di(meth)acrylate, triethylene glycol di(meth)acrylate, polyethylene glycol di(meth)acrylate, propylene glycol di(meth)acrylate, and divinylbenzene can also be used in combination.

In the (meth)acrylic resin (A1), a content ratio of the (meth)acrylate-based monomer (a1) is preferably 10% to 100% by weight, particularly preferably 20% to 95% by weight, a content ratio of the functional group-containing monomer (a2) is preferably 0 to 90% by weight, particularly preferably 5% to 80% by weight, and a content ratio of another copolymerizable monomer (a3) is preferably 0 to 50% by weight, particularly preferably 5% to 40% by weight.

The (meth)acrylic resin (A1) in the present invention is preferably a polymer containing methyl (meth)acrylate as a polymerization component, particularly preferably a polymer containing methyl methacrylate as a polymerization component, more preferably polymethyl methacrylate in terms of being excellent in compatibility with a urethane (meth)acrylate-based compound suitable as the reactive oligomer (B) having one or more unsaturated groups and in terms of adjusting hardness of the cured product [i].

In the present invention, the (meth)acrylic resin (A1) can be manufactured by polymerizing the above monomer components (a1) to (a3). Such polymerization can be performed by a conventionally well-known method such as solution radical polymerization, suspension polymerization, bulk polymerization, and emulsion polymerization. For example, in an organic solvent, a polymerization monomer such as the (meth)acrylate-based monomer (a1), the functional group-containing monomer (a2), and another copolymerizable monomer (a3) and a polymerization initiator (azobisisobutyronitrile, azobisisovaleronitrile, benzoyl peroxide, and the like) are mixed or dropped, and polymerized in a reflux state or from 50° C. to 90° C. for 2 to 20 hours.

Examples of the organic solvent used in the polymerization reaction include aromatic hydrocarbons such as toluene and xylene, aliphatic hydrocarbons such as hexane, esters such as ethyl acetate and butyl acetate, aliphatic alcohols such as n-propyl alcohol and isopropyl alcohol, and ketones such as acetone, methyl ethyl ketone, methyl isobutyl ketone, and cyclohexanone.

A glass transition temperature (Tg) of the (meth)acrylic resin (A1) is generally 40° C. to 120° C., more preferably 60° C. to 110° C. When such a glass transition temperature is too high, an amount of the (meth)acrylic resin (A1) which can be blended in preparation of the thermosetting composition {i} is limited, a viscosity adjustment range of the uncured thermosetting composition [i] is narrowed, and then strength tends to decrease since durability of the uncured product [i] decreases and the cured product [i] becomes too hard, and thermal durability of the cured product [i] tends to decrease when the glass transition temperature is too low.

The glass transition temperature (Tg) is a temperature calculated by the following Fox equation:

$$1/Tg = w1/Tg1 + w2/Tg2 + \ldots wk/Tgk$$

Wherein, Tg is a glass transition temperature of a copolymer, Tg1, Tg2, . . . , Tgk is Tg of a single copolymer of each monomer component, w1, w2, . . . , wk represent a mole fraction of each monomer component, and w1+w2+ . . . +wk=1.

A weight average molecular weight of the (meth)acrylic resin (A1) such obtained is generally 10,000 to 3,000,000, preferably 20,000 to 2,500,000.

When such a weight average molecular weight is too small, the uncured thermosetting composition [i] becomes soft and adhesion properties become higher than necessary, handling properties tend to decrease, and the cured product [i] tends to become brittle. When such a weight average molecular weight is too large, there is a tendency of causing decrease in coatability, for example, the viscosity of the thermosetting composition [i] before coating the support film [II] becomes too high, or it becomes difficult to increase a concentration, and there is a tendency that flexibility of the thermosetting composition layer [I] before curing decreases and it becomes difficult to wind the laminated film of the present invention into a roll shape.

The weight average molecular weight is a weight average molecular weight based on standard polystyrene molecular weight conversion, and can be measured by using three columns: Shodex GPC KF-806L (exclusion limit molecular weight: $2\times10^7$, separation range: 100 to $2\times10^7$, theoretical stage number: 10,000 stages/column, filler material: styrene-divinylbenzene copolymer, filler particle size: 10 μm) in series in high speed liquid chromatography ("Waters 2695 (main body)" and "Waters 2414 (detector)" manufactured by Japan Waters Co., Ltd.).

<Reactive Oligomer (B) Having One or More Unsaturated Groups>

Examples of the reactive oligomer (B) having one or more unsaturated groups in the present invention include a urethane (meth)acrylate-based oligomer (B1), an epoxy (meth)acrylate-based compound, and a polyester (meth)acrylate-based compound. Among them, the urethane (meth)acrylate-based oligomer (B1) is preferable in terms of imparting appropriate elasticity to the cured layer [I].

Hereinafter, the urethane (meth)acrylate-based oligomer (B1) will be described more specifically.

<Urethane (Meth)Acrylate-Based Oligomer (B1)>

Examples of the urethane (meth)acrylate-based oligomer (B1) used in the present invention include the urethane (meth)acrylate-based oligomer (B1) obtained by a reaction of a hydroxyl group-containing (meth)acrylate-based compound (b1), a polyvalent isocyanate-based compound (b2), and a polyol-based compound (b3).

A weight average molecular weight of the urethane (meth)acrylate-based oligomer (B1) used in the present invention is preferably 500 to 50,000, particularly preferably 1,000 to 30,000. When such a weight average molecular weight is too small, the cured layer [I] tends to be brittle; when the weight average molecular weight is too large, the cured layer [I] tends to become too hard and impact resistance tends to decrease.

The above weight average molecular weight is a weight average molecular weight based on the standard polystyrene molecular weight conversion, and can be measured by using three columns: Shodex GPC KF-806L (exclusion limit molecular weight: $2\times10^7$, separation range: 100 to $2\times10^7$, theoretical stage number: 10,000 stages/column, filler material: styrene-divinylbenzene copolymer, filler particle size: 10 μm) in series in high speed liquid chromatography (Shodex GPC system-11 type manufactured by Showa Denko K.K.).

Viscosity of the urethane (meth)acrylate-based oligomer (B1) at 60° C. is preferably 500 to 150,000 mPa·s, particularly preferably 500 to 120,000 mPa·s, and more preferably 1,000 to 100,000 mPa·s. When such viscosity is out of the above range, coatability when the support film [II] is coated with the thermosetting composition [i] tends to decrease.

Incidentally, the viscosity can be measured by an E-type viscometer.

[Hydroxyl Group-Containing (Meth)Acrylate-Based Compound (b1)]

Examples of the hydroxyl group-containing (meth)acrylate-based compound b1) include hydroxyalkyl (meth)acrylates such as hydroxyalkyl such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, 2-hydroxyethyl acryloyl phosphate, 2-(meth)acryloyloxyethyl-2-hydroxypropyl phthalate, caprolactone modified 2-hydroxyethyl (meth)acrylate, dipropylene glycol (meth)acrylate, fatty acid modified-glycidyl (meth)acrylate, polyethylene glycol mono(meth)acrylate, polypropylene glycol mono(meth)acrylate, 2-hydroxy-3-(meth)acryloyloxypropyl (meth)acrylate, glycerin di(meth)acrylate, 2-hydroxy-3-acryloyl-oxypropyl methacrylate, pentaerythritol tri(meth)acrylate, caprolactone modified pentaerythritol tri(meth)acrylate, ethylene oxide-modified pentaerythritol tri(meth)acrylate, dipentaerythritol penta(meth)acrylate, caprolactone-modified dipentaerythritol penta(meth)acrylate, and ethylene oxide-modified dipentaerythritol penta(meth)acrylate.

Among these, a hydroxyl group (meth)acrylate-based compound having one ethylenically unsaturated group is preferable in terms of being able to alleviate cure shrinkage during formation of the cured layer [I], a hydroxyalkyl (meth)acrylate such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate are particularly preferable, and using 2-hydroxyethyl (meth)acrylate is more preferable in terms of excellent reactivity and versatility.

These can be used alone or in combination of two or more kinds thereof.

[Polyvalent Isocyanate-Based Compound (b2)]

Examples of the polyvalent isocyanate-based compound (b2) include aromatic polyisocyanates such as tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate; aliphatic polyisocyanates such as hexamethylene diisocyanate, trimethylhexamethyelen diisocyanate, lysine diisocyanate, and lysine triisocyanate; alicyclic polyisocyanates such as hydrogenated diphenylmethane diisocyanate, hydrogenated xylylene diisocyanate, isophorone diisocyanate, norbornene diisocyanate, 1,3-bis(isocyanatomethyl) cyclohexane; or trimeric compounds or multimeric compounds of these polyisocyanates, allophanate-type polyisocyanates, biuret-type polyisocyanates, and water-dispersed polyisocyanates (such as "Aquanate 100", "Aquanate 110", "Aquanate 200", and "Aquanate 210" manufactured by Nippon Polyurethane Industry Co.).

Among these, aliphatic diisocyanates such as pentamethylene diisocyanate, hexamethylene diisocyanate, trimethylhexamethyelen diisocyanate, and lysine diisocyanate and alicyclic diisocyanates such as hydrogenated diphenylmethane diisocyanate, hydrogenated xylylene diisocyanate, isophorone diisocyanate, norbornene diisocyanate, and 1,3-bis (isocyanatomethyl)cyclohexane are preferably used in terms of little yellowing, isophorone diisocyanate, hydrogenated diphenylmethane diisocyanate, and hydrogenated xylylene diisocyanate are particularly preferably used in terms of little cure shrinkage, and isophorone diisocyanate is more preferably used in terms of excellent reactivity and versatility.

[Polyol-Based Compound (b3)]

Examples of the polyol compound (b3) include a polyether-based polyol, a polyester-based polyol, a polycarbonate-based polyol, a polyolefin-based polyol, a polybutadiene-based polyol, a (meth)acrylic polyol, a polysiloxane-based polyol, and alkylene glycols such as ethylene glycol, propylene glycol, and neopentyl glycol.

Examples of the polyether-based polyol include alkylene structure-containing polyether-based polyols such as polyethylene glycol, polypropylene glycol, polytetramethylene glycol, polybutylene glycol, and polyhexamethylene glycol, and random or block copolymers of these polyalkylene glycols.

Examples of the polyester-based polyol include a condensation polymer of a polyvalent alcohol and a polyvalent carboxylic acid; a ring-opening polymer of a cyclic ester (lactone); and a reactant of three kinds of components of the polyvalent alcohol, the polyvalent carboxylic acid, and the cyclic ester.

Examples of the polyvalent alcohol include ethylene glycol, diethylene glycol, propylene glycol, dipropylene glycol, trimethylene glycol, 1,4-tetramethylene diol, 1,3-tetramethylene diol, 2-methyl-1,3-trimethylene diol, 1,5-pentamethylene diol, neopentyl glycol, 1,6-hexamethylene diol, 3-methyl-1,5-pentamethylene diol, 2,4-diethyl-1,5-pentamethylene diol, glycerin, trimethylolpropane, trimethylolethane, cyclohexanediols (1,4-cyclohexanediol and the like), bisphenols (bisphenol A and the like), and sugar alcohols (xylitol, sorbitol, and the like).

Examples of the polyvalent carboxylic acid include aliphatic dicarboxylic acids such as malonic acid, maleic acid, fumaric acid, succinic acid, glutaric acid, adipic acid, suberic acid, azelaic acid, sebacic acid, and dodecanedioic acid; alicyclic dicarboxylic acids such as 1,4-cyclohexane dicarboxylic acid; and aromatic dicarboxylic acids such as terephthalic acid, isophthalic acid, orthophthalic acid, 2,6-naphthalene dicarboxylic acid, paraphenylene dicarboxylic acid, and trimellitic acid.

Examples of the cyclic ester include propiolactone, β-methyl-δ-valerolactone, and ε-caprolactone.

Examples of the polycarbonate-based polyol include a reactant of the polyvalent alcohol and phosgene; and a ring-opening polymer of cyclic carbonate (alkylene carbonate and the like).

Examples of the polyvalent alcohol include the polyvalent alcohol exemplified in description of the polyester-based polyol, and examples of the alkylene carbonate include ethylene carbonate, trimethylene carbonate, tetramethylene carbonate, and hexamethylene carbonate.

The polycarbonate-based polyol may be, for example, a compound having a carbonate bond in a molecule thereof and a hydroxyl group at an end thereof, and may have an ester bond together with the carbonate bond.

Examples of the polyolefin-based polyol include those having a homopolymer or a copolymer of ethylene, propylene, and butene as a saturated hydrocarbon skeleton and having a hydroxyl group at a molecular end thereof.

Examples of the polybutadiene-based polyol include those having a copolymer of butadiene as a hydrocarbon skeleton and having a hydroxyl group at a molecular end thereof.

The polybutadiene-based polyol may be a hydrogenated polybutadiene polyol in which all or a part of ethylenically unsaturated groups contained in a structure thereof is hydrogenated.

Examples of the (meth)acrylic polyol include those having at least two hydroxyl groups in a molecule of a polymer or a copolymer of (meth)acrylate, examples of such a (meth)acrylate include an alkyl (meth)acrylate such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, decyl (meth) acrylate, dodecyl (meth)acrylate, and octadecyl (meth)acrylate.

Examples of the polysiloxane-based polyol include a dimethyl polysiloxane polyol and a methylphenyl polysiloxane polyol.

Among these, the polyester-based polyol and the polyether-based polyol are preferable, and the polyester-based polyol is particularly preferable in terms of excellent mechanical properties such as flexibility or the like at the time of curing.

A weight average molecular weight of the polyol-based compound (b3) is preferably 500 to 8,000, particularly preferably 550 to 5,000, and more preferably 600 to 3,000. When the weight average molecular weight of the polyol-based compound (b3) is too large, the mechanical properties of the cured layer [I] tends to decrease during curing; and when the weight average molecular weight is too small, cure shrinkage tends to be large and stability tends to decrease.

The above weight average molecular weight is a weight average molecular weight based on the standard polystyrene molecular weight conversion, and can be measured by using three columns: Shodex GPC KF-806L (exclusion limit molecular weight: $2\times10^7$, separation range: 100 to $2\times10^7$, theoretical stage number: 10,000 stages/column, filler material: styrene-divinylbenzene copolymer, filler particle size: 10 μm) in series in high speed liquid chromatography (Shodex GPC system-11 type manufactured by Showa Denko K.K.).

The urethane(meth)acrylate-based oligomer (B1) generally can be manufactured by charging the hydroxyl group-containing (meth)acrylate-based compound (b1), the polyvalent isocyanate-based compound (b2), and the polyol-based compound (b3) into a reactor collectively or separately and allowing them to react. A urethane (meth)acrylate-based oligomer can also be manufactured by reaction of the hydroxyl group-containing (meth)acrylate-based compound (b1) in a reaction product obtained by reaction between the polyol-based compound (b3) and the polyvalent isocyanate-based compound (b2) in advance, and this manufacture method is useful in terms of stability of reaction and decrease of by-products.

In the reaction between the polyol-based compound (b3) and the polyvalent isocyanate-based compound (b2), a well-known reaction method can be used. On this occasion, for example, by controlling a molar ratio of an isocyanate group in the polyvalent isocyanate-based compound (b2) to a hydroxyl group in the polyol-based compound (b3) to usually about 2n:(2n-2) (n is an integer of 2 or more), a terminal isocyanate group-containing urethane (meth)acrylate-based compound in which the isocyanate group remains is obtained, and then an addition reaction with the hydroxyl group-containing (meth)acrylate-based compound (b1) becomes possible.

Also in the addition reaction between the reaction product and the hydroxyl group-containing (meth)acrylate-based compound (b1) in which the reaction product is obtained by reaction between the polyol-based compound (b3) and the polyvalent isocyanate-based compound (b2) in advance, a well-known reaction method can be used.

With regard to the reaction molar ratio of the reaction product to the hydroxyl group-containing (meth)acrylate-based compound (b1), for example, in a case where the number of the isocyanate groups of the polyvalent isocyanate-based compound (b2) is two and the number of the hydroxyl group of the hydroxyl group-containing (meth)acrylate-based compound (b1) is one, the ratio of the reaction product to the hydroxyl group-containing (meth)acrylate-based compound (b1) is about 1:2; in a case where the number of the isocyanate groups of the polyvalent isocyanate-based compound (b2) is three and the number of the hydroxyl group of the hydroxyl group-containing (meth) acrylate-based compound (b1) is one, the ratio of the reaction product to the hydroxyl group-containing (meth)acrylate-based compound (b1) is about 1:3.

In the addition reaction between the reaction product and the hydroxyl group-containing (meth)acrylate-based compound (b1), the urethane (meth)acrylate-based oligomer (B1) is obtained by ending the reaction at the time point when the content of the remaining isocyanate group in the reaction system becomes 0.5% by weight or less.

In such a reaction between the polyol-based compound (b3) and the polyvalent isocyanate-based compound (b2) and the reaction between the reaction product and the hydroxyl group-containing (meth)acrylate-based compound (b1), a catalyst for the purpose of accelerating the reaction is also preferably used. Examples of such a catalyst include organometallic compounds such as dibutyltin dilaurate, dibutyltin diacetate, trimethyltin hydroxide, tetra-n-butyltin, zinc bisacetylacetonate, zirconium tris(acetylacetonate) ethyl acetoacetate, and zirconium tetraacetylacetonate, metal salts such as zinc octoate, tin octoate, cobalt naphthenate, stannous chloride, and stannic chloride, amine-based catalysts such as triethylamine, benzyldiethylamine, 1,4-diazabicyclo[2,2,2]octane, 1,8-diazabicyclo[5,4,0]undecene, N,N,N',N'-tetramethyl-1,3-butanediamine, and N-ethylmorpholine, bismuth-based catalysts such as bismuth nitrate, bismuth bromide, bismuth iodide, bismuth sulfide, also organic bismuth compounds such as dibutylbismuth dilaurate and dioctylbismuth dilaurate, and organic acid bismuth salts such as 2-ethylhexanoic acid bismuth salt, naphthenic acid bismuth salt, isodecanoic acid bismuth salt, neodecanoic acid bismuth salt, lauric acid bismuth salt, maleic acid bismuth salt, stearic acid bismuth salt, oleic acid bismuth salt, linoleic acid bismuth salt, acetic acid bismuth salt, bismuth bisneodecanoate, disalicylic acid bismuth salt, and digallic acid bismuth salt, and the like. Among them, dibutyltin dilaurate and 1,8-diazabicyclo[5,4,0]undecene are suitable.

Moreover, in the reaction between the polyol-based compound (b3) and the polyvalent isocyanate-based compound (b2) and further the reaction between the reaction product and the hydroxyl group-containing (meth)acrylate-based compound (b1), organic solvents which do not have a functional group that reacts with the isocyanate group, for example, organic solvents such as esters such as ethyl acetate and butyl acetate, ketones such as methyl ethyl ketone and methyl isobutyl ketone, aromatics such as toluene and xylene can be used.

The reaction temperature is usually 30 to 90° C., and preferably 40 to 80° C. and the reaction time is usually 2 to 10 hours, and preferably 3 to 8 hours.

The urethane (meth)acrylate-based oligomer (B1) used in the present invention preferably has 20 or less ethylenically unsaturated groups, particularly preferably has 10 or less ethylenically unsaturated groups, and more preferably has 5 or less ethylenically unsaturated groups in terms of utilizing adhesion properties to fibers. A lower limit of the number of ethylenically unsaturated groups is generally 2.

A content ratio (weight ratio) of the binder polymer (A) and the reactive oligomer (B) having one or more unsaturated group is generally 90:10 to 10:90, preferably 70:30 to 20:80, and particularly preferably 60:40 to 30:70. When the binder polymer (A) is too little (the reactive oligomer (B) is too much), adhesion appears on a surface of the cured layer [I] after curing, then, subsequent steps are hindered, the cure shrinkage of the cured layer [I] is large and tends to become a factor of cracking in the cured layer [I]; when the hinder polymer (A) is too much (the reactive oligomer (B) is too little), the thermosetting composition layer [I] becomes too hard, and cracks occur in the thermosetting composition layer [I] by handling the laminated film of the present invention, followability, flexibility of the fiber cured product, and the like tend to decrease when the laminated film of the present invention is laminated on a fiber layer such as a fiber sheet.

<Thermal Polymerization Initiator (C)>

It is important that the thermal polymerization initiator (C) in the present invention has a 10-hour half-life temperature of 65° C. or higher, preferably 70° C. to 200° C., particularly preferably 75° C. to 170° C., and more preferably 80° C. to 150° C. When such a half-life temperature is too low, the thermosetting composition [i] is cured before melting, and there is a tendency that sufficient adhesion properties cannot be obtained and smoothness of the surface cannot be obtained without infiltrating the fibers.

Examples of the thermal polymerization initiator (C) include an azobis-based compound having a 10-hour half-life temperature of 65° C. or higher and a peroxide-based compound having a 10-hour half-life temperature of 65° C. or higher. Specific examples of the azobis-based compound having a 10-hour half-life temperature of 65° C. or higher and the peroxide-based compound having a 10-hour half-life temperature of 65° C. or higher are shown below. The temperature described together with each of the following compounds is the 10-hour half-life temperature.

Examples of the azobis-based compound having a 10-hour half-life temperature of 65° C. or higher include azobis-based compounds such as 2,2'-azobis isobutyronitrile (65° C.), 2,2'-azobis (2-methylbutyronitrile) (66° C.), dimethyl-2,2'-azobis isobutyrate (66° C.), and 1,1'-azobis (cyclohexane-1-carbonitrile) (88° C.).

Examples of the peroxide-based compound having a 10-hour half-life temperature of 65° C. or higher include peroxide-based compounds such as 2,5-dimethyl-2,5-di(2-ethyl hexanoate) hexane (66.2° C.), t-hexyl peroxy-2-ethyl hexanoate (69.9° C.), di(4-methylbenzoyl) peroxide (70.6° C.), t-butyl peroxy-2-ethyl hexanoate (72.1° C.), benzoyl peroxide (73.6° C.), 1,1'-di(t-hexyl peroxy) cyclohexane (87.1° C.), 1,1-di(t-butyl peroxy) cyclohexane (90.7° C.), t-hexyl peroxy isopropyl monocarbonate (95.0° C.), t-butyl peroxy malonic acid (96.1° C.), t-butyl peroxy laurate (98.3° C.), t-hexyl peroxy benzoate (99.4° C.), t-butyl peroxy acetate (101.9° C.), t-butyl benzoyl peroxide (104.3° C.), dicumyl peroxide (116.4° C.), t-butyl cumyl peroxide (119.5° C.), di-t-butyl peroxide (123.7° C.), diisopropyl benzene hydroperoxide (128.0° C.), diisopropyl benzene hydroperoxide (145.1° C.), cumene hydroperoxide (157.9° C.), and t-butyl hydroperoxide (166.5° C.).

These compounds can be used alone or in combination of two or more kinds thereof.

Among them, the peroxide-based compound in terms of little gas generated at the time of curing is preferable, and specific examples thereof include 1,1'-di(t-hexyl peroxy) cyclohexane (87.1° C.), 1,1'-di(t-butyl peroxy) cyclohexane (90.7° C.), t-hexyl peroxy isopropyl monocarbonate (95.0° C.), t-butyl peroxy malonic acid (96.1° C.), t-butyl peroxy laurate (98.3° C.), t-hexyl peroxy benzoate (99.4° C.), t-butyl peroxy acetate (101.9° C.), t-butyl benzoyl peroxide (104.3° C.), dicumyl peroxide (116.4° C.), t-butyl cumyl peroxide (119.5° C.), di-t-butyl peroxide (123.7° C.), diisopropyl benzene hydroperoxide (128.0° C.), and diisopropyl benzene hydroperoxide (145.1° C.).

As an auxiliary agent of these, it is also possible to use triethanolamine, triisopropanolamine, 4,4'-dimethylamino benzophenone (Michler's ketone), 4,4'-diethylamine benzophenone, 2-dimethylaminoethyl benzoic acid, ethyl 4-dimethylamino benzoate, (n-butoxy) ethyl 4-dimethylamino benzoate, isoamyl 4-dimethylamino benzoate, 2-ethylhexyl 4-dimethylamino benzoate, 2,4-diethyl thioxanthone, 2,4-diisopropyl thioxanthone, and the like in combination.

A content of the thermal polymerization initiator (C) in the thermosetting composition [i] is preferably 0.1 to 30 parts by weight, particularly preferably 0.5 to 20 parts by weight, and more preferably 1 to 10 parts by weight when a total of nonvolatile components of the binder polymer (A) component, the reactive oligomer (B) component, and a reactive monomer (D) component described below is 100 parts by weight.

When the content of the thermal polymerization initiator (C) is too low, the cured layer [I] becomes insufficiently cured and sufficient elasticity or hardness cannot be obtained, and the cured layer [I] tends to become brittle and function thereof cannot be accomplished; when the content is too high, the thermal polymerization initiator (C) bleeds out during custody of the thermosetting composition layer [I], and crystals tend to precipitate in the cured layer [I].

<Reactive Monomer (D) Having One or More Unsaturated Groups>

The thermosetting composition [i] in the present invention preferably further contains the reactive monomer (D) having one or more unsaturated groups.

Examples of the reactive monomer (D) having one or more unsaturated groups can include a monofunctional monomer, a bifunctional monomer, a trifunctional or higher monomer, and other ethylenically unsaturated monomers.

A monomer containing one ethylenically unsaturated group is used as the monofunctional monomer. Examples thereof include styrene, vinyltoluene, chlorostyrene, α-methylstyrene, methyl (meth)acrylate, ethyl (meth)acrylate, acrylonitrile, vinyl acetate, 2-hydroxyethyl (meth)acrylate, 2-hydroxypropyl (meth)acrylate, 2-hydroxybutyl (meth)acrylate, phenoxyethyl (meth)acrylate, 2-phenoxy-2-hydroxypropyl (meth)acrylate, 2-hydroxy-3-phenoxypropyl (meth)acrylate, 3-chloro-2-hydroxypropyl (meth)acrylate, glycerin mono(meth)acrylate, glycidyl (meth)acrylate, lauryl (meth)acrylate, cyclohexyl (meth)acrylate, isobornyl (meth)acrylate, tricyclodecanyl (meth)acrylate, dicyclopentenyl (meth)acrylate, n-butyl (meth)acrylate, hexyl (meth)acrylate, heptyl (meth)acrylate, octyl (meth)acrylate, nonyl (meth)acrylate, decyl (meth)acrylate, isodecyl (meth)acrylate, dodecyl (meth)acrylate, n-stearyl (meth)acrylate, benzyl (meth)acrylate, phenol ethylene oxide modified (meth) acrylate, nonylphenol propylene oxide modified (meth) acrylate, half ester (meth)acrylates of phthalic acid derivatives such as 2-(meth)acryloyloxy-2-hydroxypropyl phthalate, furfuryl (meth)acrylate, carbitol (meth)acrylate, benzyl (meth)acrylate, butoxyethyl (meth)acrylate, ally (meth)acrylate, acryloylmorpholine, 2-hydroxyethylacrylamide, N-methylol (meth)acrylamide, N-vinylpyrrolidone, 2-vinylpyridine, and 2-(meth)acryloyloxy ethyl acid phosphate monoester.

A monomer containing two ethylenically unsaturated groups is used as the bifunctional monomer. Examples thereof include ethylene glycol di(meth)acrylate, diethylene glycol di(meth)acrylate, tetraethylene glycol di(meth)acrylate, polyethylene glycol di(meth)acrylate, propylene glycol di(meth)acrylate, dipropylene glycol di(meth)acrylate, polypropylene glycol di(meth)acrylate, butylene glycol di(meth) acrylate, neopentyl glycol di(meth)acrylate, ethylene oxide-modified bisphenol A-type di(meth)acrylate, propylene oxide-modified bisphenol A-type di(meth)acrylate, 1,6-hexanediol di(meth)acrylate, 1,6-hexanediol ethylene oxide-modified di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, phthalic acid diglycidyl ester di(meth) acrylate, hydroxypivalic acid-modified neopentyl glycol di(meth)acrylate, isocyanuric acid ethylene oxide-modified diacrylate, and 2-(meth)acryloyloxy ethyl acid phosphate diester.

A monomer containing three or more ethylenically unsaturated groups is used as the trifunctional or higher monomer. Examples thereof include trimethylolpropane tri (meth)acrylate, pentaerythritol tri(meth)acrylate, pentaerythritol tetra(meth)acrylate, dipentaerythritol tri(meth) acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, isocyanuric acid ethylene oxide-modified tri(meth)acrylate, ethylene oxide-modified dipentaerythritol penta(meth)acrylate, ethylene oxide-modified dipentaerythritol hexa(meth) acrylate, ethylene oxide-modified pentaerythritol tri(meth) acrylate, ethylene oxide-modified pentaerythritol tetra (meth)acrylate, and succinic acid-modified pentaerythritol tri(meth) acrylate.

Examples of the other ethylenically unsaturated monomers include the Michael adduct of acrylic acid or 2-acryloyloxyethyl dicarboxylic acid monoester, and examples of the Michael adduct of acrylic acid include acrylic acid dimer, methacrylic acid dimer, acrylic acid trimer, methacrylic acid trimer, acrylic acid tetramer, and methacrylic acid tetramer. Examples of the 2-acryloyloxyethyl dicarboxylic acid monoester which is a carboxylic acid having a specific substituent include 2-acryloyloxyethyl succinic acid monoester, 2-methacryloyloxyethyl succinic acid monoester, 2-acryloyloxyethyl phthalic acid monoester, 2-methacryloyloxyethyl phthalic acid monoester, 2-acryloyloxyethyl hexahydrophthalic acid monoester, and 2-methacryloyloxyethyl hexahydrophthalic acid monoester. Furthermore, oligoester acrylates are also included.

The reactive monomer (D) having one or more unsaturated groups in the present invention is preferably a polyfunctional monomer of the bifunctional monomers and the trifunctional or higher monomer, and particularly preferably a polyfunctional (meth)acrylate-based compound (d1).

A content of the reactive monomer (D) In the thermosetting composition [i] is preferably 1 to 100 parts by weight, particularly preferably 3 to 80 parts by weight, and more preferably 5 to 70 parts by weight when a total of nonvolatile components of the binder polymer (A) component and the reactive oligomer (B) component is 100 parts by weight.

When the content of the reactive monomer (D) is too low, the flexibility and workability of the thermosetting composition layer [I] tend to decrease; when the content is too high, the cured layer [I] becomes too hard, impact resistance thereof tends to decrease, and the cured layer [I] tends to become brittle.

In the thermosetting composition [i] of the present invention, well-known additives such as plasticizer, antioxidant, solvent, surface tension modifier, stabilizer, chain transfer agent, and surfactant may be blended as necessary.

<Laminated Film for Fiber Adhesion and/or Fiber Sheet Surface Protection>

The laminated film for fiber adhesion and/or fiber sheet surface protection has a structure in which the layer [I] containing the thermosetting composition [i] and the support film [II] are laminated.

Examples of the support film [II] include a polyethylene terephthalate (PET) film, a release PET film, a polypropylene film, a polyethylene film, a polyethylene naphthalate film, a polyvinyl alcohol-based film, an ethylene-vinyl alcohol copolymer-based film, and the like, or paper or the like whose surface is laminated with a resin layer is preferably used.

Among them, the PET film, the release PET film subjected to release treatment, or the paper whose surface is laminated with a resin layer (hereinafter, sometimes referred to as release paper) is particularly preferably used in terms of heat resistance during film formation and curing of the thermosetting composition layer [I]. When the release PET film or the release paper is used, the release treatment or formation of the resin layer may be performed on only one side or both sides of the film or the paper.

A thickness of the support film [II] is preferably 5 µm or more, particularly preferably 10 to 200 µm, and more preferably 20 to 100 µm.

In the laminated film for fiber adhesion and/or fiber sheet surface protection of the present invention, a protective film [III] may be laminated on a side of the thermosetting composition layer [I]where the support film [II] is not laminated.

The protective film [III] is used for the purpose of preventing transfer and the like of the thermosetting composition layer [I] having adhesion to the support film [II] when the laminated film of the present invention is formed into a roll shape. Examples of such a protective film [III] include a polyethylene film, a release PET film, a polypropylene film, a polyvinyl alcohol-based film, an ethylene-vinyl alcohol copolymer-based film, a polytetrafluoroethylene film, a nylon film, and release paper. Among them, the release PET film and the release paper are preferable.

A thickness of the protective film [III] is preferably 5 µm or more, particularly preferably 10 to 200 µm, and more preferably 15 to 100 µm.

Examples of a method of manufacturing the laminated film of the present invention include uniformly applying the thermosetting composition [i] to one side of the support film [II] and drying in an oven at a temperature of 50° C. to 120° C. or a rising sequential temperature for generally 1 to 60 minutes to form the thermosetting composition layer [I]. When the protective film [III] is used, a method of forming the thermosetting composition layer [I] and then pressurizing and laminating the protective film [III] on an upper surface of the layer [I] is included.

When used for adhering to fibers in the laminated film of the present invention, the thermosetting composition layer [I] has a thickness of preferably 50 µm or more, particularly preferably 80 to 500 µm, and more preferably 100 to 300 µm.

In the laminated film of the present invention, when design is imparted to the cured layer [I] obtained by curing the thermosetting composition layer [I], the thickness of the thermosetting composition layer [I] is preferably 100 µm or more, particularly preferably 150 to 500 µm, and more preferably 250 to 300 µm.

When the thickness of such a thermosetting composition layer [I] is too small, the number of lamination layers is too large to obtain a suitable thickness for adhesion or surface protection of the fibers, so that a lamination process tends to be complicated and cost tends to be too high, or it tends to be difficult to obtain a suitable thickness for the adhesion or protection. When such a thickness is too large, the thermosetting composition [i] is dried to form the thermosetting composition layer [I], which tends to take too much time.

<Thermosetting Composition for Fiber Adhesion and/or Fiber Sheet Surface Protection>

The thermosetting composition for fiber adhesion and/or fiber sheet surface protection of the present invention contains the hinder polymer (A), the reactive oligomer (B) having one or more unsaturated groups, and the thermal polymerization initiator (C) having a 10-hour half-life temperature of 65° C. or higher.

The method of producing the thermosetting composition for fiber adhesion and/or fiber sheet surface protection of the present invention is not particularly limited, and can be obtained, for example, by dissolving the binder polymer (A), the reactive oligomer (B) having one or more unsaturated groups, and the thermal polymerization initiator (C) having a 10-hour half-life temperature of 65° C. or more in an organic solvent, adding an additive or the like as necessary, and mixing.

The laminated film of the present invention or the thermosetting composition of the present invention thus obtained can be used to adhere to fibers such as a carbon fiber and a glass fiber to each other and/or to protect a surface of the fiber sheet containing such fibers.

Examples of the fibers to which the laminated film of the present invention or the thermosetting composition of the present invention can be used include reinforced fibers such as a glass fiber, a carbon fiber, an aramid fiber, a boron fiber, an alumina fiber, and a silicon carbide fiber, and two or more kinds of these fibers may be mixed and used. The glass fiber and the carbon fiber are preferably used in order to obtain a lighter and more durable molded article.

A form and an arrangement of the fibers are not particularly limited, and examples thereof include long fibers, tows, fabrics (cloths), mats, knits, and braids which are paralleled in one direction.

A method of manufacturing a prepreg using the laminated film of the present invention is outlined as an example.

Examples of the method of manufacturing a prepreg using the laminated film of the present invention include laminating the fiber sheet and the laminated film, peeling the support film [II] of the laminated film, further laminating another laminated film on the fiber sheet or thermosetting composition layer [I] if necessary, and then impregnating the fiber sheet with the thermosetting composition [i] by heating and pressurizing. Examples of the method of heating and pressurizing include press molding, autoclave molding, and internal pressure molding.

EXAMPLES

The following will further specifically describe the present invention with reference to Examples but the invention is not limited to the following Examples unless it exceeds the gist thereof.

Incidentally, "part(s)" and "%" in Examples mean those based on weight.

The followings were prepared as each component.
<Binder Polymer (A)>
(A1-1): polymethyl methacrylate ("Dianal BR-83" manufactured by Mitsubishi Rayon Co., Ltd.)
<Reactive Oligomer (B) Having One or More Unsaturated Groups>
The following urethane acrylate-based oligomer (B1) was prepared as the reactive oligomer (B) having one or more unsaturated groups.
(B1): Into a four-necked flask equipped with a thermometer, a stirrer, a water-cooling condenser, and a nitrogen gas blowing inlet, 30.6 g (0.138 mol) of isophorone diisocyanate, 53.2 g (0.069 mol) of bifunctional polyester polyol (hydroxyl value: 145 mg KOH/g, number average molecular weight: 800), 0.04 g of 2,6-di-tert-butylcresol as a polymerization inhibitor, and 0.02 g of dibutyltin dilaurate as a reaction catalyst were charged and allowed to react at 70° C. for 6 hours, and 16.2 g (0.140 mol) of 2-hydroxyethyl acrylate was charged and allowed to react at 60° C. for 3 hours. The reaction ended when the remaining isocyanate group was 0.1%, and a bifunctional urethane acrylate oligomer (B1-1) (weight average molecular weight: 5,600, viscosity at 60° C.: 56,000 mPa·s) was obtained.

<Thermal Polymerization Initiator (C)>
(C1): 1,1'-di(t-hexyl peroxy) cyclohexane ("Perhexa HC" manufactured by NOF Corporation) (10-hour half-life temperature: 87.1° C.)
(C2): t-butyl benzoyl peroxide ("Perbutyl Z" manufactured by NOF Corporation) (10-hour half-life temperature: 104.3° C.)
(C'): dilauroyl peroxide ("Peroyl L" manufactured by NOF Corporation) (10-hour half-life temperature: 61.6° C.)
<Reactive Monomer (D) Having One or More Unsaturated Groups>
(D1): polyethylene glycol diacrylate ("A-200" manufactured by Shin-Nakamura Chemical Co., Ltd.)
<Epoxy Resin (E)>
(E1): bisphenol A type epoxy resin ("jER828" manufactured by Mitsubishi Chemical Corporation)
<Epoxy Curing Agent (F)>
(F1): 1-methylimidazole (manufactured by Nippon Synthetic Chemical Industry Co., Ltd.)

Test Example 1

Example 1-1

A resin solution in which the binder polymer (A1-1) was diluted with ethyl acetate to 40% and an oligomer solution in which the urethane acrylate oligomer (B1-1) was diluted with 2-butanone to 75% were mixed so that a weight ratio of nonvolatile components of the binder polymer (A1-1) to the urethane acrylate-based oligomer (B1-1) is 44:56. Further, the reactive monomer (D1) was mixed so that the binder polymer (A1-1) and the urethane acrylate-based oligomer (B1-1) are 20 parts with respect to a total of 100 parts of nonvolatile components.

Next, the thermal polymerization initiator (C1) was mixed so that a mixture of (A1-1), (B1-1), and (D1) are 2 parts with respect to 100 parts of nonvolatile components, and a thermosetting composition [i-1] solution having a concentration of nonvolatile components of 60% was obtained.

The thermosetting composition [i-1] solution was coated onto a polyester film [II] having a thickness of 30 μm by using an applicator having a gap width of 0.35 mm, and the film was dried at 60° C. for 3 minutes and at 80° C. for 3 minutes, so that a thermosetting composition layer [I-1] having a thickness of 100 μm was formed, and a laminated film (X1) for fiber adhesion was obtained.

The obtained laminated film (X1) for fiber adhesion was used and evaluated as follows.

(Adhesion Properties of Fiber Sheet)

Two glass fiber sheets ("HG300" manufactured by Unitika Ltd., 100 mm×15 mm in size, 270 μm in thickness) were prepared, the thermosetting composition layer [I-1] of the laminated film (X1) for fiber adhesion was formed on one glass fiber sheet to peel off the polyester film [II], and further, the thermosetting composition layer [I-1] of a second laminated film (X1) for fiber adhesion was formed again on such a thermosetting composition layer [I-1] to peel off the polyester film [II]. The remaining one glass fiber sheet was provided on the second thermosetting composition layer [I-1] to form the thermosetting composition layer [I-1] of 200 μm between the two glass fiber sheets. This laminated product was pressed with a pressure of 4.2 MPa for 1 minute by a pressing machine heated to 150° C. to adhere to the two glass fiber sheets. After that, when a 180° peel test was performed, the two glass fiber sheets were not peeled off at a stress of 9 N/15 mm, which shows strong adhesion properties.

Example 1-2

A laminated film (X2) was obtained in the same manner as in Example 1-1, except that the thermal polymerization initiator (C1) was changed to (C2). The obtained laminated film (X2) for fiber adhesion was evaluated in the same manner as in Example 1-1.

As a result, the two glass fiber sheets were not peeled off, which shows strong adhesion properties.

Comparative Example 1-1

A laminated film (X') was obtained in the same manner as in Example 1, except that the thermal polymerization initiator (C1) was changed to (C'). The obtained laminated film (X') for fiber adhesion was evaluated in the same manner as in Example 1.

As a result, the two glass fiber sheets were peeled off, which does not show strong adhesion properties.

The above result showed that permeation of a resin into the fiber and thermal curing can be performed conveniently by laminating and hot pressing the fiber on the laminated film for fiber adhesion and/or fiber sheet surface protection of the present invention. That is, the laminated film of the present invention was excellent in adhesion properties of the fiber sheet. The laminated film of the present invention was bonded, and a surface of a thermally cured fiber became smooth. Since surface smoothness is excellent, design formability is also excellent.

Test Example 2

Example 2-1

The thermosetting composition layer [I-1] having a thickness of 100 μm was formed, and the laminated film (X1) for fiber adhesion was obtained in the same manner as in Example 1-1.

The obtained laminated film (X1) for fiber adhesion was used and evaluated as follows.

(Flexibility of Fiber Sheet)

Two glass fiber sheets (manufactured by Unitika Ltd., 100 mm×20 mm in size, 1 mm in thickness) were prepared, a surface of the thermosetting composition layer [I-1] of the laminated film (X1) for fiber adhesion was pasted on one glass fiber sheet to peel off the polyester film [II], the thermosetting composition layer [I-1] was formed on the glass fiber sheet, and further, a surface of the thermosetting composition layer [I-1] of a second laminated film (X1) for fiber adhesion was pasted again on such a thermosetting composition layer [I-1] to peel off the polyester film [II]. The remaining one glass fiber sheet was provided on the second thermosetting composition layer [I-1] to form the thermosetting composition layer [I-1] of 200 μm between the two glass fiber sheets. This laminated product was pressed with a pressure of 4.2 MPa for 1 minute by a pressing machine heated to 150° C., so that the thermosetting composition layer [I-1] was cured while the glass fiber sheet was impregnated on both sides, and the two glass fiber sheets were adhered. Then, as a result of bending a portion of 50 mm in the middle of the sheet in a longitudinal direction at 90° so as to run along a rod having a diameter of 5 mm, cracks were not observed on a surface of a fiber cured product in which the glass fiber sheet was impregnated and the thermosetting composition layer [I-1] was cured, and the fiber cured product having a high flexibility was obtained.

Comparative Example 2-1

Two parts of the epoxy curing agent (F1) with respect to 100 parts of nonvolatile components of the epoxy resin (E1) were added and mixed for 1 minute, and then the obtained epoxy resin was coated onto the glass fiber sheet (manufactured by Unitika Ltd., 100 mm×20 mm in size, 1 mm in thickness) to a thickness of 200 μm to further cover the glass fiber sheet. The laminated product was pressed with a pressure of 4.2 MPa for 1 minute by a pressing machine heated to 150° C., so that the two glass fiber sheets were adhered. The obtained fiber cured product was subjected to the same bending evaluation as in Example 2-1. As a result, cracks were observed on the surface.

The evaluation results of the above Example 2-1 and Comparative Example 2-1 were summarized in Table 1.

In the table, "○" indicates that no crack was observed on the surface of the obtained fiber cured product, and "×" indicates that a crack was observed on the surface of the obtained fiber cured product.

TABLE 1

|  | Bending test at portion of 50 mm |
|---|---|
| Example 2-1 | ○ |
| Comparative Example 2-1 | x |

The above results showed that the laminated film of the present invention was useful for adhering to the fiber sheet since the fiber cured product having a high flexibility was obtained by laminating and hot pressing the fiber sheet on the laminated film for fiber adhesion and/or fiber sheet surface protection of the present invention. That is, the laminated film of the present invention was excellent in adhesion properties of the fiber sheet. The laminated film of the present invention was bonded, and a surface of a thermally cured fiber reinforced plastic became smooth. Since surface smoothness is excellent, design formability is also excellent.

While the present invention has been described in detail with reference to specific embodiments, it is apparent to those skilled in the art that various changes and modifications can be made without departing from the spirit and scope of the present invention. The present application is based on Japanese Patent Application (Japanese Patent Application No. 2016-187444) filed on Sep. 26, 2016 and Japanese Patent Application (Japanese Patent Application No. 2016-187445) filed on Sep. 26, 2016 and the entire contents of which are incorporated herein by reference.

The invention claimed is:
1. A laminated film for fiber adhesion and/or fiber sheet surface protection in which a layer [I] containing a thermo- setting composition [i] and a support film [II] are laminated, wherein layer [I] has a thickness of from 50 μm to 250 μm,
  wherein the thermosetting composition [i] contains a thermal polymerization initiator (C) having a 10-hour half-life temperature of 65° C. or higher,
  wherein the thermosetting composition further contains a binder polymer (A), and
  wherein the binder polymer (A) is a (meth)acrylic resin (A1).

2. The laminated film for fiber adhesion and/or fiber sheet surface protection according to claim 1, wherein the thermosetting composition [i] further contains a reactive oligomer (B) having one or more unsaturated groups.

3. The laminated film for fiber adhesion and/or fiber sheet surface protection according to claim 1, wherein the thermal polymerization initiator (C) having a 10-hour half-life temperature of 65° C. or higher is an azobis-based compound having a 10-hour half-life temperature of 65° C. or higher or a peroxide-based compound having a 10-hour half-life temperature of 65° C. or higher.

4. The laminated film for fiber adhesion and/or fiber sheet surface protection according to claim 1, wherein the thermosetting composition [i] further contains a reactive monomer (D) having one or more unsaturated groups.

5. The laminated film for fiber adhesion and/or fiber sheet surface protection according to claim 2, wherein the thermosetting composition [i] further contains a reactive monomer (D) having one or more unsaturated groups.

6. The laminated film for fiber adhesion and/or fiber sheet surface protection according to claim 2, wherein the reactive oligomer (B) having one or more unsaturated group s is a urethane (meth)acrylate-based oligomer (B1).

7. The laminated film for fiber adhesion and/or fiber sheet surface protection according to claim 6, wherein the urethane (meth)acrylate-based oligomer (B1) is a urethane (meth)acrylate-based compound obtained by a reaction of a hydroxyl group-containing (meth)acrylate-based compound (b1), a polyvalent isocyanate-based compound (b2), and a polyol-based compound (b3).

8. The laminated film for fiber adhesion and/or fiber sheet surface protection according to claim 6, wherein the urethane (meth)acrylate-based oligomer (B1) has a weight average molecular weight of 500 to 50,000.

9. The laminated film for fiber adhesion and/or fiber sheet surface protection according to claim 1, wherein a protective film [III] is laminated on a side of the layer [I] containing the thermosetting composition [i] where the support film [II] is not laminated.

* * * * *

UNITED STATES PATENT AND TRADEMARK OFFICE
CERTIFICATE OF CORRECTION

PATENT NO. : 11,198,281 B2
APPLICATION NO. : 16/363451
DATED : December 14, 2021
INVENTOR(S) : Y. Aoki et al.

It is certified that error appears in the above-identified patent and that said Letters Patent is hereby corrected as shown below:

In the Claims

At Column 22, Line 7 (Claim 6, Line 3), please change "group s" to -- groups --.

Signed and Sealed this
Twenty-fourth Day of May, 2022

Katherine Kelly Vidal
*Director of the United States Patent and Trademark Office*